(12) United States Patent
Liao

(10) Patent No.: US 8,289,636 B2
(45) Date of Patent: Oct. 16, 2012

(54) AUTO-FOCUS LENS MODULE

(75) Inventor: Chia-Hung Liao, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 12 days.

(21) Appl. No.: 12/981,554

(22) Filed: Dec. 30, 2010

(65) Prior Publication Data

US 2012/0105987 A1  May 3, 2012

(30) Foreign Application Priority Data

Oct. 28, 2010 (TW) .............................. 99136865 A

(51) Int. Cl.
  *G02B 7/02* (2006.01)
(52) U.S. Cl. ....................................... 359/819; 359/811
(58) Field of Classification Search .................. 359/811, 359/813, 819, 821–824
See application file for complete search history.

(56) References Cited

U.S. PATENT DOCUMENTS 6,069,867 A * 5/2000 Ikegame ....................... 369/248
8,120,862 B2 * 2/2012 Lin et al. ....................... 359/822

* cited by examiner

*Primary Examiner* — Thomas K Pham
*Assistant Examiner* — Brandi Thomas
(74) *Attorney, Agent, or Firm* — Altis Law Group, Inc.

(57) ABSTRACT

An auto-focus lens module includes a lens holder, a movable member, and a focusing spring assembly. The lens holder includes an immovable member and an upper plate. The upper plate has a surface facing the immovable member. First recesses are defined in the first surface. The movable member is received in the immovable member, and includes a lens barrel and ring. The lens barrel has a top surface. The ring is protruded from the top surface of the lens barrel. Arc portions equidistantly extend upward from the ring and are received in the recesses correspondingly. The focusing spring assembly contacts the immovable member and confines the movable member in the immovable member.

10 Claims, 4 Drawing Sheets

AUTO-FOCUS LENS MODULE

BACKGROUND

1. Technical Field

The present disclosure relates to lens modules and, particularly, to an auto-focus lens module for increasing focusing accuracy.

2. Description of Related Art

A related lens module includes a lens barrel and a lens holder receiving the lens barrel therein. The lens barrel is driven to move relative to the lens holder along an optical axis thereof during a focusing process. A number of poles are protruded from an end surface of the lens holder to limit the range of motion of the lens barrel relative to the lens holder. However, the poles of the lens holder may hit against the lens barrel during the focusing process, and may be deformed or broken.

Therefore, it is desirable to provide an auto-focus lens module that can overcome the limitations described.

DETAILED DESCRIPTION

Embodiments of the disclosure will now be described in detail, with reference to the accompanying drawings.

Figure 1:
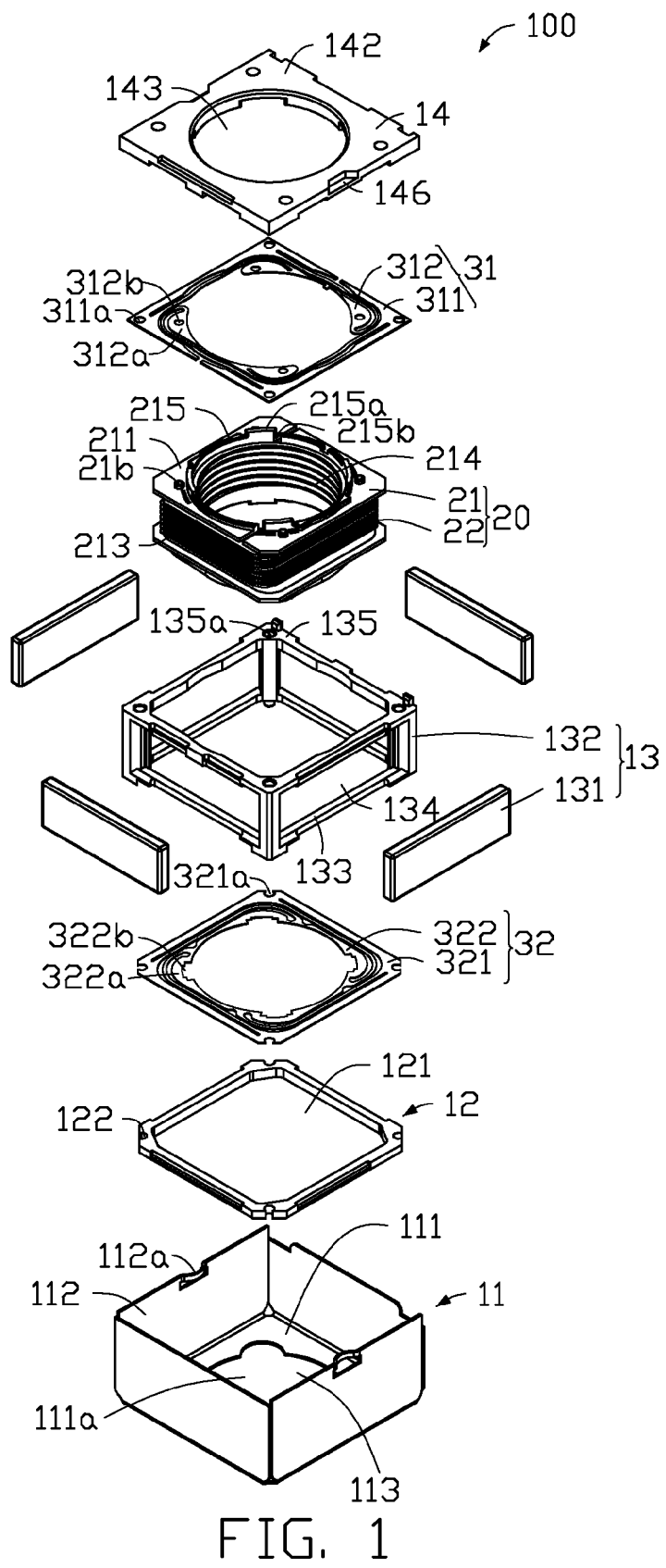
FIG. 1 is an isometric, exploded, and schematic view of an auto-focus lens module in accordance with an exemplary embodiment.
Figure 2:
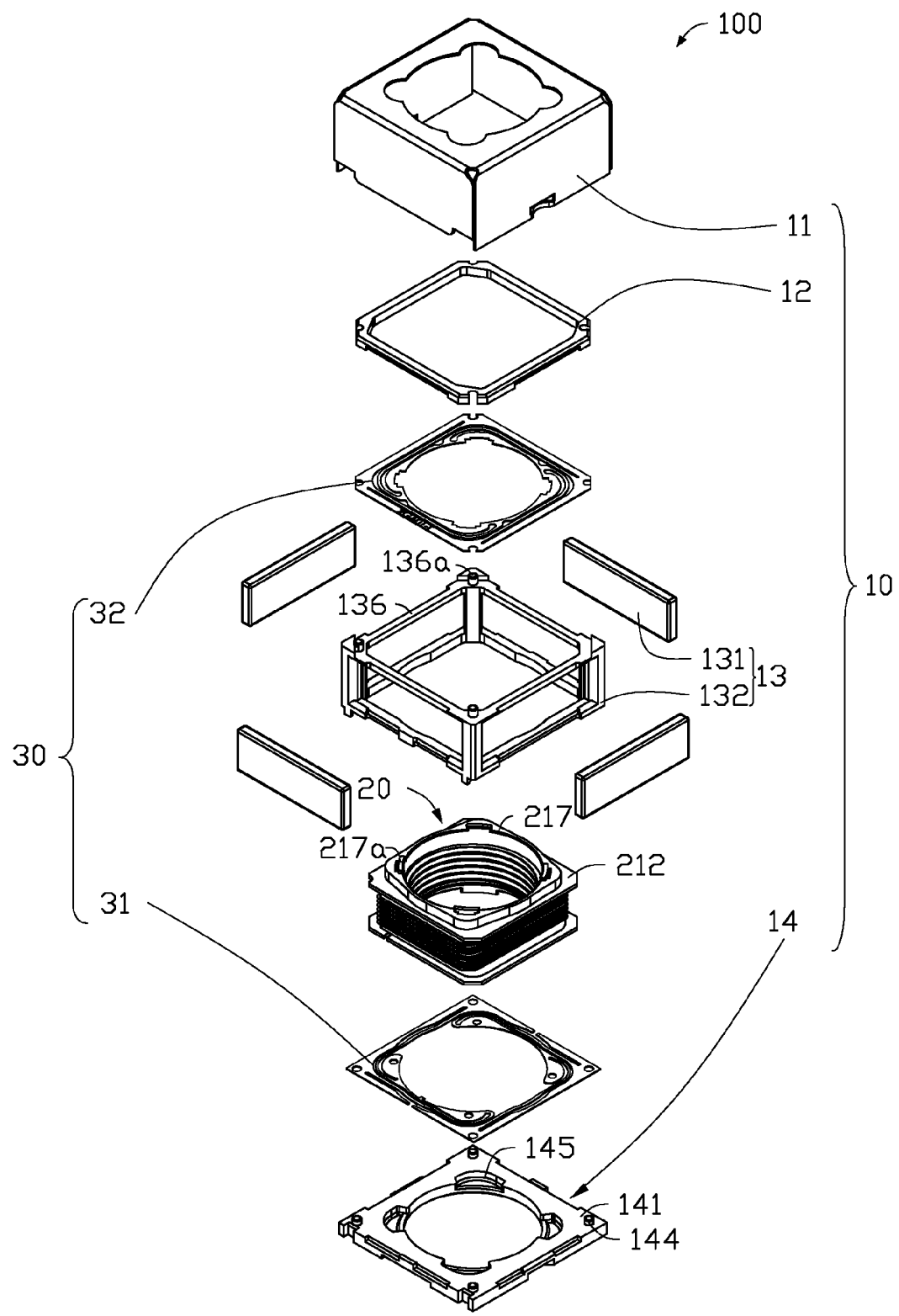
FIG. 2 is similar to FIG. 1, but viewed from another angle.

Referring to FIGS. 1-2, an auto-focus lens module 100, according to an exemplary embodiment, includes a lens holder 10, a movable member 20, and a focusing spring assembly 30. The movable member 20 is received in the lens holder 10, and the focusing spring assembly 30 is interconnected between the lens holder 10 and the movable member 20.

The lens holder 10 has a hollow cubic configuration, and includes a case 11, a lower plate 12, an immovable member 13, and an upper plate 14. The case 11 includes a substantially rectangular bottom plate 111 and four first sidewalls 112 extending upward from the edges of the bottom plate 111. A first through hole 111a is generally defined at the center of the bottom plate 111. The four first sidewalls 112 and the bottom plate 111 cooperatively define a receiving room 113. Two clasps 112a are formed in two opposite first sidewalls 112 by, for example stamping, at edges thereof away from the bottom plate 111, and generally at the centers thereof. The two clasps 112a face each other and extend toward each other.

The lower plate 12 has a hollow cubic configuration, and a square second through hole 121 is generally defined at the center of the lower plate 12. Four first position holes 122 are defined at four corners of the lower plate 12.

The immovable member 13 includes a bracket 132 and four magnetic members 131. The bracket 132 is generally a hollow cubic frame, and includes four second sidewalls 133 connected to each other. A slot 134 is defined on each of the second sidewalls 133 to receive a corresponding magnetic member 131 therein. The bracket 132 includes an upper surface 135 and a lower surface 136 opposite to the upper surface 135. Four second position holes 135a are defined at four corners of the upper surface 135 respectively. Four first position poles 136a are extended down from four corners of the lower surface 136.

The upper plate 14 is rectangular, and includes a first surface 141 and a second surface 142 opposite to the first surface 141. The upper plate 14 defines a second through hole 143 generally extending through the center of the first surface 141 and the second surface 142. Four second position poles 144 are extended downward from four corners of the first surface 141 of the upper plate 14. Four first recesses 145 are equidistantly defined around the second through hole 143 in the first surface 141 of the upper plate 14. The four first recesses 145 communicate with the second through hole 143. Two second recesses 146 are defined on two opposite edges of the second surface 142 of the upper plate 14.

The movable member 20 includes a lens barrel 21 and a coil 22. The lens barrel 21 has a cubic configuration, includes a top surface 211, a bottom surface 212, and a side surface 213 interconnected between the top surface 211 and the bottom surface 212. A screw hole 214 is defined through the top surface 211 and the bottom surface 212, generally at the center of the lens barrel 21. A first ring 215 is protruded from the top surface 211 of the lens barrel 21, and the first ring 215 circles around the edge of the screw hole 214. Four arc portions 215a are equidistantly extended upward from the first ring 215. The radian of each arc portion 215a is in a range from about 10 degrees to about 90 degrees. A number of air holes 215b are defined on the first ring 215 and are adjacent to the arc portions 215a. The air holes 215b communicate with the screw hole 214. Four third position poles 21b are protruded from the corners of the top surface 211 of the lens barrel 21. A second ring 217 is protruded from the bottom surface 212 of the lens barrel 21, and the second ring 217 circles around the edge of the screw hole 214. Four fixing portions 217a are equidistantly extended downward from the second ring 217. The coil 22 encircles the side surface 213 of the lens barrel 21.

The focusing spring assembly 30 includes an upper spring sheet 31 and a lower spring sheet 32. The upper spring sheet 31 and the lower spring sheet 32 can be formed by punching, and are made of steel. The upper spring sheet 31 is square-shaped, and includes a first outer portion 311 and a first inner portion 312. The first outer portion 311 is a square frame, and four first fixing holes 311a are defined at four corners of the first outer portion 311. The first inner portion 312 includes four substantially semicircular first connection portions 312a connected to the four inner corners of the first outer portion 311. A second fixing hole 312b is defined on each of the first connection portions 312a. The lower spring sheet 32 is square-shaped, and includes a second outer portion 321 and a second inner portion 322. The second outer portion 321 is a square frame, and four third fixing holes 321a are defined at four corners of the second outer portion 321. The second inner portion 322 includes four substantially semicircular second connection portion 322a connected to the four inner corners of the second outer portion 321. A fixing notch 322b is defined on each of the second connection portions 322a.

Figure 3:
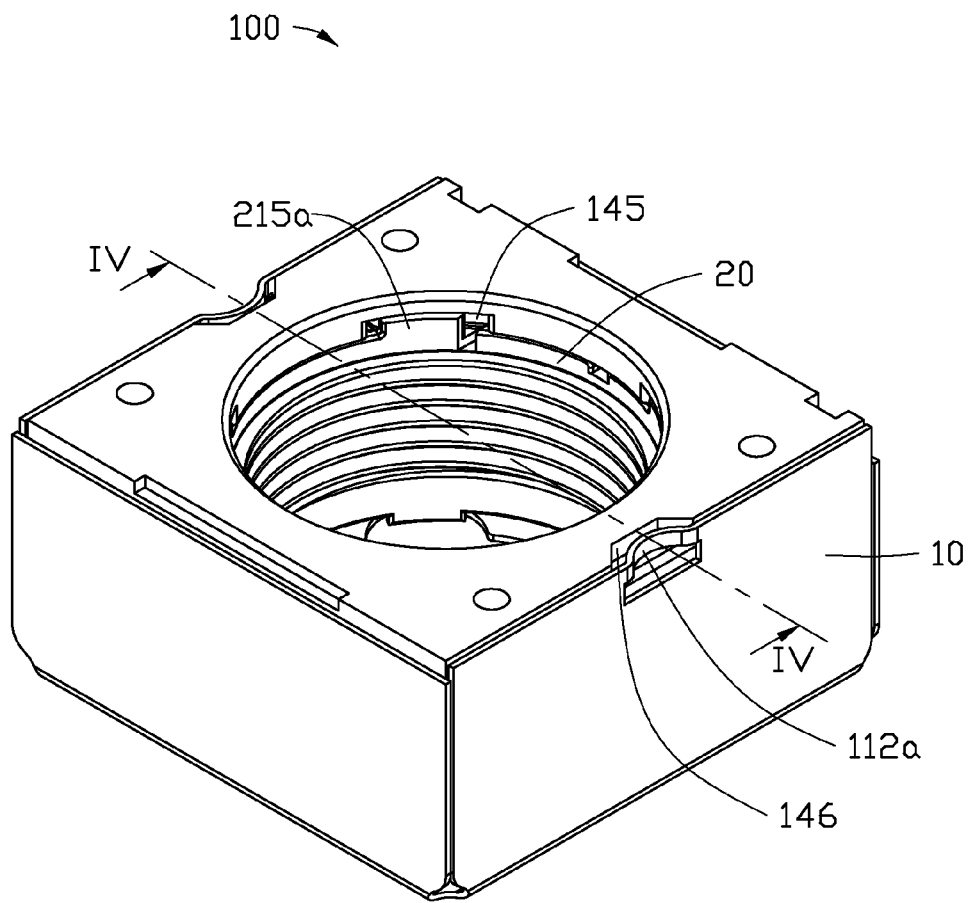
FIG. 3 is an assembled view of the auto-focus lens module of FIG. 1.
Figure 4:
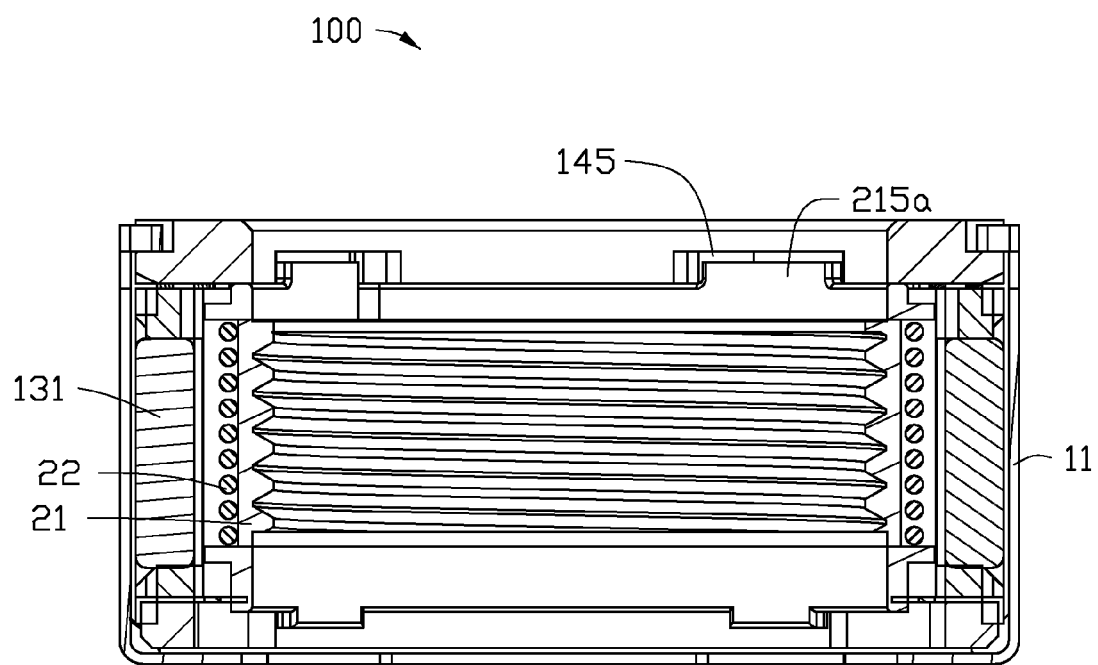
FIG. 4 is a cross-sectional view taken along a line IV-IV of FIG. 3.

Referring to FIGS. 3-4, in assembly, the lower plate 12, the immovable member 13, and the upper plate 14 are received in the receiving room 113 of the case 11. The lower plate 12 is positioned upon the bottom plate 111. The lower spring sheet 32 is placed on the lower plate 12 with the third fixing holes 321a coaxial with the first position holes 122. The immovable member 13 is assembled on the lower spring sheet 32 with the first position poles 136a passing through the third fixing holes 321a and received in the first position holes 122. The movable member 20 is assembled in the receiving room 113 with the bottom surface 212 adjacent to the bottom plate 111. The movable member 20 is received in the immovable member 13. The fixing portions 217a of the lens barrel 21 is received in the fixing notch 322b of the lower spring sheet 32. The second connection portions 322a are bonded to the second ring 217 with an adhesive. The coil 22 faces the magnetic members 131 received in the bracket 132. The upper spring sheet 31 covers the bracket 132 and the first ring 215. The second fixing holes 312b of the first connected portions 312a are sleeved on the third position poles 21b of the lens barrel 21, and the first fixing holes 311a are coaxial with the second position holes 135a of the bracket 132. Then, the upper plate 14 is covered on the upper spring sheet 31 with the second position poles 144 passing through the first fixing holes 311a of the first outer portion 311 and received in the second position holes 135a. The clasps 112a of the case 11 are latched in the second recesses 146 of the upper plate 14 to fasten the upper plate 14 and the case 11. The arc portions 215a of the lens barrel 21 are received in the first recesses 145 of the upper plate 14.

During focusing, the coil 22 circled on the lens barrel 21 is supplied with current. The movable member 20 is driven to move along the optical axis thereof. The arc portions 215a of the lens barrel 21 are moved up and down in the first recesses 145 of the upper plate 14 accordingly. As the arc portions 215a contact the first recesses 145 with a larger contacting area, the arc portions 215a will not deform easily when the arc portions 215a hit against the upper plate 14. Therefore, the focusing accuracy of the auto-focus lens module 100 will not be adversely affected.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. An auto-focus lens module, comprising:
a lens holder comprising an immovable member and an upper plate, the upper plate having a first surface facing the immovable member, a plurality of first recesses defined in the first surface;
a movable member received in the immovable member, and comprising a lens barrel and a first ring, the lens barrel having a top surface, the first ring protruding from the top surface and comprising a plurality of arc portions, the arc portions extending upward from the first ring and received in the first recesses correspondingly; and
a focusing spring assembly contacting the immovable member and confining the movable member in the immovable member.

2. The auto-focus lens module of claim 1, wherein the lens holder further comprises a case and a lower plate, the lower plate, the immovable member, and the upper plate all are received in the case.

3. The auto-focus lens module of claim 2, wherein the case comprises a bottom plate and four first sidewalls extending upward from edges of the bottom plate, two clasps are formed in two opposite first sidewalls at the edges of the two opposite first sidewalls away from the bottom plate; the upper plate has a second surface opposite to the first surface, two second recesses are defined in two opposite edges of the second surface; the clasps are latched in the second recesses correspondingly.

4. The auto-focus lens module of claim 3, wherein the immovable member comprises a bracket and four magnetic members, the bracket is rectangular in shaped and comprises four second sidewalls, the magnetic members are attached on the second sidewalls correspondingly, the movable member further comprises a coil encircling the lens barrel, the magnetic members face the coil.

5. The auto-focus lens module of claim 4, wherein four first position holes are defined in the lower plate, four first position poles are extended downward from the bracket; the first position poles are received in the first position holes correspondingly.

6. The auto-focus lens module of claim 4, wherein four second position holes are defined in the bracket opposite to the first position poles, four second position poles are extended downward from the first surface of the upper plate, the second position poles are received in the second position holes correspondingly.

7. The auto-focus lens module of claim 2, wherein the focusing spring assembly comprises an upper spring sheet and a lower spring sheet, the upper spring sheet is positioned between the immovable member and the upper plate, the lower spring sheet is positioned between the lower plate and the immovable member, the upper spring sheet and the lower spring sheet contact two opposite sides of the immovable member and cooperatively confine the movable member in the immovable member.

8. The auto-focus lens module of claim 7, wherein the upper spring sheet comprises a first outer portion and four first connection portions connected to four inner corners of the first outer portion, a fixing hole is defined on each of the first connection portions, four third position poles are protruded from the top surface of the lens barrel, the third position poles are received in the fixing hole correspondingly.

9. The auto-focus lens module of claim 7, wherein the lower spring sheet comprises a second outer portion and four second connection portions connected to four inner corners of the second outer portion, a fixing notch is defined on each of the second connection portions, the movable member comprises a second ring protruding from the lens barrel and opposite to the first ring, four fixing portions extend downward from the second ring, the fixing portions are received in the fixing notch corresponding.

10. The auto-focus lens module of claim 1, wherein the lens barrel further comprises a bottom surface opposite to the top surface, a screw hole is defined through the top surface and the bottom surface of the lens barrel, a plurality of air holes are defined in the first ring and communicated with the screw hole.

* * * * *